United States Patent
Lee et al.

(10) Patent No.: US 9,367,795 B2
(45) Date of Patent: Jun. 14, 2016

(54) MOMENTUM-BASED BALANCE CONTROLLER FOR HUMANOID ROBOTS ON NON-LEVEL AND NON-STATIONARY GROUND

(75) Inventors: Sung-Hee Lee, Gwangju (KR); Ambarish Goswami, Fremont, CA (US)

(73) Assignee: Honda Motor Co., Ltd., Tokyo (JP)

( * ) Notice: Subject to any disclaimer, the term of this patent is extended or adjusted under 35 U.S.C. 154(b) by 151 days.

(21) Appl. No.: 13/580,477

(22) PCT Filed: Feb. 24, 2011

(86) PCT No.: PCT/US2011/026100
§ 371 (c)(1),
(2), (4) Date: Aug. 22, 2012

(87) PCT Pub. No.: WO2011/106543
PCT Pub. Date: Sep. 1, 2011

(65) Prior Publication Data
US 2012/0316684 A1    Dec. 13, 2012

Related U.S. Application Data

(60) Provisional application No. 61/308,207, filed on Feb. 25, 2010.

(51) Int. Cl.
*G05B 15/00* (2006.01)
*G06N 3/00* (2006.01)
*B62D 57/032* (2006.01)

(52) U.S. Cl.
CPC .............. *G06N 3/008* (2013.01); *B62D 57/032* (2013.01)

(58) Field of Classification Search
CPC ...... B25J 9/1633; B25J 9/1674; B25J 9/1638; G05B 19/416; G05B 19/4163
USPC ......................................................... 700/261
See application file for complete search history.

(56) References Cited

U.S. PATENT DOCUMENTS 4,505,166 A * 3/1985 Tesar .......................... 74/490.01
6,393,340 B2 * 5/2002 Funda ..................... B25J 9/1648
                                                     318/568.1

(Continued)

FOREIGN PATENT DOCUMENTS

JP    2003-326483 A    11/2003
JP    2005-052968 A    3/2005

(Continued)

OTHER PUBLICATIONS

IEEE Transactions on systems, Man, and Cybernetics—Part A, vol. 34. No. 5 Froce acting on a Biped Robot. Center of Pressure-Zero Moment Point., PHillippe Sardain and Guy Bessonnnnet, Sep. 2004.*

(Continued)

*Primary Examiner* — Ian Jen
(74) *Attorney, Agent, or Firm* — Arent Fox LLP

(57) ABSTRACT

A momentum-based balance controller controls a humanoid robot to maintain balance. The balance controller derives desired rates of change of linear and angular momentum from desired motion of the robot. The balance controller then determines desired center of pressure (CoP) and desired ground reaction force (GRF) to achieve the desired rates of change of linear and angular momentum. The balance controller determines admissible CoP, GRF, and rates of change of linear and angular momentum that are optimally close to the desired value while still allowing the robot to maintain balance. The balance controller controls the robot to maintain balance based on a human motion model such that the robot's motions are human-like. Beneficially, the robot can maintain balance even when subjected to external perturbations, or when it encounters non-level and/or non-stationary ground.

20 Claims, 8 Drawing Sheets

(56) References Cited

U.S. PATENT DOCUMENTS

| | | | |
|---|---|---|---|
| 7,313,463 B2* | 12/2007 | Herr et al. | 700/245 |
| 7,650,204 B2* | 1/2010 | Dariush | A61H 3/008 600/587 |
| 8,442,687 B2* | 5/2013 | Nagasaka | B62D 57/032 700/262 |
| 2005/0234593 A1* | 10/2005 | Goswami | B62D 57/032 700/245 |
| 2005/0240307 A1* | 10/2005 | Kuroki | B25J 13/085 700/245 |
| 2006/0033462 A1* | 2/2006 | Moridaira | B25J 9/1674 318/568.12 |
| 2006/0241809 A1* | 10/2006 | Goswami | B62D 57/032 700/245 |
| 2006/0293791 A1* | 12/2006 | Dariush | B25J 9/0006 700/245 |
| 2007/0016329 A1* | 1/2007 | Herr | B62D 57/032 700/250 |
| 2007/0185618 A1* | 8/2007 | Nagasaka | B62D 57/032 700/245 |
| 2007/0255454 A1* | 11/2007 | Dariush | G06N 3/008 700/245 |
| 2008/0133055 A1* | 6/2008 | Hasegawa | B62D 57/032 700/252 |
| 2009/0069940 A1* | 3/2009 | Honda | B25J 5/00 700/258 |
| 2009/0321150 A1 | 12/2009 | Kwon et al. | |
| 2011/0029130 A1* | 2/2011 | Goswami et al. | 700/250 |
| 2012/0316684 A1* | 12/2012 | Lee | G06N 3/008 700/261 |
| 2012/0330463 A1* | 12/2012 | Schreiber et al. | 700/260 |

FOREIGN PATENT DOCUMENTS

| | | |
|---|---|---|
| JP | 2006-167890 A | 6/2006 |
| JP | 2007-531636 A | 11/2007 |
| JP | 2008-534304 A | 8/2008 |
| JP | 2009-233841 A | 10/2009 |
| WO | WO 2006/105420 A2 | 10/2006 |

OTHER PUBLICATIONS

Kajita, S., et al., "Balancing a Humanoid Robot Using Backdrive Concerned Torque Control and Direct Angular Momentum Feedback," in Proceedings of the 2001 IEEE International Conference on Robotics & Automation, Seoul, Korea, May 21-26, 2001, vol. 4, pp. 3376-3382.

Macchietto, A., et al., "Momentum Control for Balance," ACM Transactions on Graphics, vol. 28, No. 3, Article 80, 8 Pages, Aug. 2009.

McGrath, S., et al., "Model-Free Active Balancing for Humanoid Robots," RoboCup 2008, LNAI 5399, pp. 544-555, 2009.

Popovic, M., et al., "Angular Momentum Regulation during Human walking: Biomechanics and Control," in Proceedings of the 2004 IEEE International Conference on Robotics & Automation, Apr. 26-May 1, 2004, vol. 3, pp. 2405-2411.

PCT International Search Report and Written Opinion, PCT Application No. US/2011/026100, Feb. 2011, eleven pages.

Japan Patent Office, Office Action, Japanese Patent Application No. 2012-555153, Nov. 11, 2014, seven pages.

Office Action for Japanese Patent Application No. JP 2012-555153, Jun. 2, 2015, 8 Pages.

\* cited by examiner

MOMENTUM-BASED BALANCE CONTROLLER FOR HUMANOID ROBOTS ON NON-LEVEL AND NON-STATIONARY GROUND

RELATED APPLICATIONS

This application claims priority from U.S. provisional application No. 61/308,207 entitled "A Momentum-Based Balance Controller for Humanoid Robots on Non-Level and Non-Stationary Ground" filed on Feb. 25, 2010, the content of which is incorporated by reference herein in its entirety.

BACKGROUND

1. Field of the Invention

The present invention relates to robotics and, more specifically, to a balance controller for controlling a humanoid robot.

2. Description of the Related Arts

Balance maintenance is one of the most important technical challenges in the design of humanoid robots. Although the basic dynamics of balance are currently understood, robust and general controllers that can deal with discrete and non-level foot support as well as large, unexpected and unknown external disturbances such as moving support, slip, and trip have not yet emerged. Especially, in comparison with the elegance and versatility of human balance, present day robots are quite deficient. In order for humanoid robots to coexist with humans in the real world, more advanced balance controllers that can deal with a broad range of environment conditions and external perturbations are desirable.

Until recently, most conventional balance control techniques have attempted to maintain balance by controlling only the linear motion of a robot. In some such techniques, the input joint angle trajectories change to modify the position of the Center of Pressure (CoP), a point within the robot's support area through which the resultant Ground Reaction Force (GRF) acts. When the CoP, computed from the input joint motion, leaves the support base (indicating a possible toppling of a foot) the motion is modified to bring the CoP back inside the support base while the robot still follows the desired linear motion of the Center of Mass (CoM). The rotational motion of the robot is more or less ignored in these approaches.

However, rotational dynamics of a robot plays a significant role in balance. A control strategy narrowly focusing only on the linear CoM motion can inadvertently allow unnecessary and potentially harmful rotational motion of the robot. Some conventional balance controllers avoid this problem somewhat heuristically, e.g., by kinematically controlling the orientation of the trunk or by adding a specific joint space controller. However, unlike humans who tightly regulate angular momentum during gait, these previous techniques do not control the robot's rotational dynamics directly. As a result, these prior techniques fail to achieve robust humanoid movements for balance control. Furthermore, these prior techniques fail to provide adequate balance control for a humanoid robot attempting to maintain balance on non-level and/or non-stationary ground.

SUMMARY OF THE INVENTION

A balance controller controls a humanoid robot to maintain balance even when the robot encounters non-level and/or non-stationary ground. The balance controller receives a desired motion of the humanoid robot and determines desired rates of change of linear and angular momentum based on the desired motion. In one embodiment, the desired motion comprises at least one of desired angular momentum $k_d$, desired center of mass (CoM) position $r_{G,d}$, desired center of mass velocity $\dot{r}_{G,d}$, desired joint accelerations $\ddot{\theta}_d$, desired foot configuration $T_d$, and desired foot velocity $v_d$. The balance controller then determines admissible rates of change of linear and angular momentum that are optimally close to the desired rates of change while still allowing the robot to maintain balance. Thus, the admissible rates of change of linear and angular momentum may differ from the desired rates of change of linear and angular momentum based on constraints imposed for balance maintenance. The balance controller generates a control output indicating joint torques for achieving the admissible rates of change of linear and angular momentum and outputs the control output to joint actuators. The joint actuators then cause the robot to move according to joint torques.

If the desired rates of change of linear and angular momentum are not simultaneously possible to achieve while maintaining balance, the balance controller may, in various embodiments, preserve the desired rate of change of linear momentum while compromising the desired rate of change of angular momentum, or vice versa. Alternatively, the balance controller may compromise both linear and angular momentum rate changes. For example, in one embodiment, the balance controller first determines a desired ground reaction force (GRF) and desired center of pressure (CoP) to achieve the desired rates of change of linear and angular momentum. Then, the balance controller determines an admissible GRF and an admissible CoP by constraining the desired GRF and desired CoP to physically achievable values. For example, in a first embodiment, if the desired CoP location is outside the support base of the robot, the balance controller translates the desired CoP location to a point under the support base of the robot that is closest to the desired CoP location while preserving the desired GRF. This preserves the desired linear momentum rate change and modifies the desired angular momentum rate change. The physical movement of the robot is characterized by a trunk rotation. In a second embodiment, the balance controller similarly translates the desired CoP location to a point under the support base of the robot closest to the desired CoP location, but also rotates the GRF angle such that the desired angular momentum rate change is preserved. This modifies the desired linear momentum rate change and is characterized by a step of the robot.

Using the momentum-based approach to balance control, the balance controller is capable of controlling the robot to maintain balance when encountering external perturbations, non-level ground, and/or non-stationary ground. Furthermore, the resulting motions of the robot are modeled after human balance mechanisms, thus allowing the robot to appear more human-like in its motions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

Figure 1:
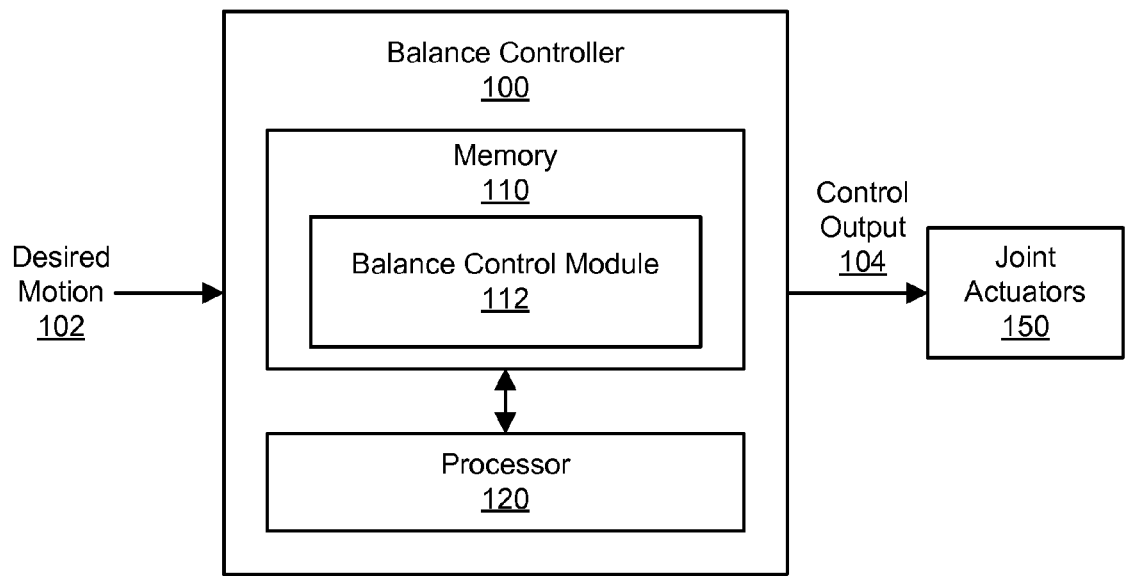
FIG. 1 illustrates a balance controller in accordance with an embodiment of the invention.

Embodiments are now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. The memory/storage can be transitory or non-transitory. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the embodiments are not described with reference to any particular programming language. It will be appreciated that a variety of programming languages may be used to implement the teachings of the embodiments as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments are intended to be illustrative, but not limiting, of the scope of the embodiments, which are set forth in the claims.

System Architecture

FIG. 1 is a block diagram illustrating an embodiment of a balance controller 100 for controlling a robot. In one embodiment, the robot is a humanoid biped robot having a human-like joint configuration (e.g., six degrees of freedom in each leg and a total mass of between 40 and 60 kgs). The balance controller 100 receives a representation of the desired motion 102 of the robot. The desired motion 102 may be irrespective of balance considerations or other physical constraints on the robot. The desired motion 102 may be derived, for example, from general instructions for the robot (e.g., walk 10 feet to the left, walk down stairs, stand still, etc.). Such motion instructions may be inputted by a human through a control mechanism, or may be generated automatically by an artificial intelligence system that controls motion decisions of the robot. In one embodiment, the desired motion 102 is defined in terms of a desired motion of the feet (e.g., configuration and velocity), angular momentum about the robot's center of mass, center of mass position and velocity, and joint accelerations. In some situations, the desired motion 102 can indicate that the robot should remain stationary (i.e., the desired angular momentum and center of mass velocity are zero).

Based on the desired motion 102, the balance controller 100 applies a momentum-based balance control algorithm to generate a control output 104 that controls joint actuators 150 which cause the robot to move. In one embodiment, the control output 104 comprises a vector of joint torques indicating the torques that the actuators will apply to each of the robot's joints. If the desired motion 102 would not result in the robot losing balance, then the control output 104 controls the joint actuators 150 to carry out the desired motion 102. On the other hand, if the balance controller 100 determines that the desired motion 102 would cause the robot to lose its balance and topple over, the balance controller 100 generates a control output 104 such that the resulting motion (an "admissible motion") is optimally close to the desired motion while still staying within the physical limitations of the robot and still allowing the robot to maintain balance. In one embodiment, the balance controller 100 is able to control the robot to maintain its balance even when the robot is subjected to external perturbations (e.g., a push) or when the robot is standing or walking on a non-level and/or non-stationary surface. The balance controller 100 may process the desired motion 102 and generate control output 104 periodically (e.g., once every millisecond) such that the robot continuously retains its balance even as its desired motion changes or when external forces acting on the robot change. Furthermore, because the balance controller 100 is based on a human motion model, the resulting motion of the robot is human-like, i.e., the robot moves to maintain its balance in a manner similar to a human.

In one embodiment, the balance controller 100 comprises a processor 120 and a memory 110. The processor 120 processes data signals and may comprise various computing architectures such as a complex instruction set computer (CISC) architecture, a reduced instruction set computer (RISC) architecture, or an architecture implementing a combination of instruction sets. Although only a single processor 120 is shown in FIG. 1, multiple processors may be included. The processor 120 comprises an arithmetic logic unit, a microprocessor, a general purpose computer, or some other information appliance equipped to transmit, receive and process electronic data signals from the memory 110 or from external inputs.

The memory 110 comprises a computer-readable storage medium that stores computer-executable instructions and computer-readable data. The instructions may comprise code for performing any and/or all of the techniques described herein. The memory 110 may furthermore temporarily or persistently store data inputted to the balance controller 100 (e.g., desired motion 102), data to be outputted by the balance controller 100 (e.g., control output 104), and any intermediate data used to carry out the process steps of the balance controller 100 described herein. Memory 104 may be a dynamic random access memory (DRAM) device, a static random access memory (SRAM) device, Flash RAM (non-volatile storage), combinations of the above, or some other memory device known in the art. In operation, the processor 120 loads the computer-executable instructions and/or data from the memory 110 to carry out the process steps described herein.

In one embodiment, the memory 110 stores a balance control module 112. The balance control module 112 stores computer-executable program instructions that when executed by the processor 106, cause the balance controller 100 to receive desired motion 102, processes the desired motion 102 using momentum-based balance control to determine how to control the robot's motion in order to achieve motion as close as possible to the desired motion while still acting within the physical capabilities of the robot and permitting the robot to retain balance, and output the control output 104 to the joint actuators 150.

The balance controller 100 may include more or less components than those shown in FIG. 1 without departing from the scope of the present invention. For example, computer system 100 may include additional memory, such as, for example, a first or second level cache, or one or more application specific integrated circuits (ASICs). In other embodiments, the balance controller 100 may be implemented entirely in hardware.

Overview

Figure 2A:
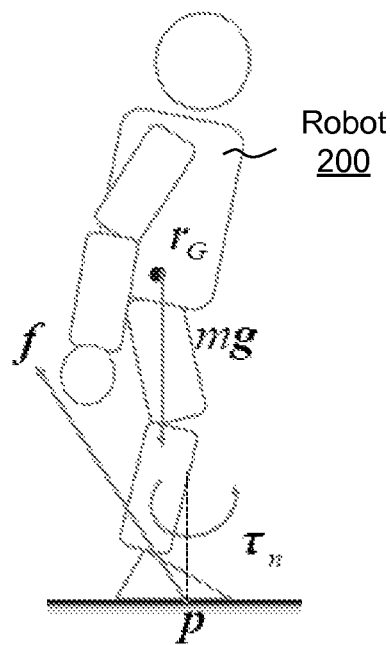
FIG. 2A is a free body diagram illustrating forces on a humanoid robot in accordance with an embodiment of the invention.

FIG. 2A is a free body diagram illustrating the external forces that act on a freely standing humanoid robot 200. These include the ground reaction force (GRF) f, the Ground Reaction Moment $\tau_n$ normal to the ground, and the weight mg of the robot 200, where m is the total robot mass and g is the acceleration due to gravity. The center of pressure (CoP) is located at a point p. According to D'Alembart's principle, the sum of external moments and external forces, respectively, are equivalent to the rates of changes of angular and linear momentum, respectively, of the robot 200. The mathematical expression for these relationships are given by (1) and (2).

$$\dot{k} = (p - r_G) \times f + \tau_n \quad (1)$$

$$\dot{l} = mg + f \quad (2)$$

In the above equations, $r_G$ is the CoM location and p is the CoP location. Together k and l is a 6×1 vector called the spatial centroidal momentum $h = [k^T \ l^T]^T$. As used herein, the spatial centroidal momentum, h, may also be referred to as spatial momentum, or simply the momentum of the robot 200.

Figure 2B:
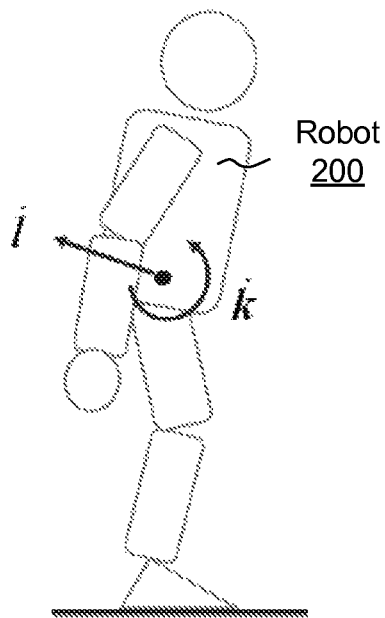
FIG. 2B is a free body diagram illustrating forces on a humanoid robot in accordance with an embodiment of the invention.

FIG. 2B depicts the robot's rate of change of angular momentum about the CoM, $\dot{k}$, and linear momentum, $\dot{l}$, respectively. The (spatial) momentum rate change has a one-to-one relationship with the GRF and CoP. As can be seen from (1) and (2), the external forces illustrated in FIG. 2A are solely responsible for the centroidal momentum rate change illustrated in FIG. 2B. Specifically, $\dot{l}$ is completely determined by f and vice versa. Furthermore, the centroidal angular momentum rate change $\dot{k}$ is determined by both GRF f and the CoP location p. Conversely, the CoP location p depends on both $\dot{k}$ and $\dot{l}$. This implies that complete control of p requires control of both linear and angular momentum.

Using this fundamental mathematical relation, the balance controller 100 maintains balance of the robot 200 by controlling both the linear and angular components of the spatial momentum. Specifically, in one embodiment, behavior of the balance controller 100 is defined in terms of the desired momentum rate change. Note that the desired momentum rate change may not always be physically realizable due to several constraints on the foot-ground contact. First, the CoP is constrained in that it cannot be located outside the robot's support base. In the single support case (i.e., the robot's feet are positioned such that they provide a single support), the support base is identical to the foot contact area, whereas in the double support case on level ground, the support base is equivalent to the convex hull of the support areas of the two feet. Second, the GRF must be unilateral in nature, and must not attract the robot 200 towards the ground. Third, the GRF must satisfy the friction limit of the foot-ground surface, so as not to cause slip. Thus, the balance controller 100 determines the admissible or physically realizable values of the momentum rate change that are as close as possible to the desired values while satisfying the above physical constraints. Subsequently, whole body joints are controlled to generate the admissible momentum rate change.

Determination of GRF and CoP of Individual Foot

In order to generate the admissible momentum, the robot controls the external forces. Out of the three external forces shown in FIG. 2A, the gravity force g cannot be manipulated, and the effect of $\tau_n$ is typically small. Therefore, the GRF f assumes substantial importance in momentum control, and its magnitude, line of action and the point of application (i.e., the CoP) have unique effect on the momentum. Due to the one-to-one correspondence between momentum rate change and GRF-CoP pair, the desired GRF and CoP are directly determined from the desired spatial momentum rate change. For single support, the desired GRF and CoP uniquely define the contact force and its location on the support foot. However, for double support, there can be infinitely many combinations of contact forces at the two feet that can create the desired momentum rate change.

One way to resolve this redundancy during double support would be to determine the GRF and CoP first, and then distribute them to each foot. However, this approach has important drawbacks. First, when the feet are located on non-level and non-continuous surfaces, the CoP may not be defined. To check the feasibility of the GRF heuristic virtual level plane may be defined or, more generally, the 3D convex hulls made by the contact points may be computed. With this approach, it is difficult to handle the case where foot/ground friction is different for the two feet.

To avoid this problem, in one embodiment, the individual foot GRF and foot CoP are instead computed directly from the desired momentum rate change. Assuming planar contact between the ground and each foot, the foot GRF is the ground reaction force acting on an individual foot and foot CoP is the location where its line of action intersects the foot support plane. These are contrasted from the more traditional net GRF and the net CoP, which are applicable when the two feet are taken together during double support.

For the present-day humanoids, which are equipped with individual foot force sensors, the use of foot GRF and foot CoP is not only a choice of convenience, but a natural choice for balance control. The foot GRF and foot CoP are directly obtained as sensor data, whereas net GRF and net CoP are computed only as a subsequent step.

The non-uniqueness of foot GRF and foot CoP during double support allows for an additional optimality criterion in the solution. Specifically, the ankle torques may be minimized while generating the desired momentum rate change. As will be described in further detail below, this may be achieved by solving two simple constrained linear least-squares problems. Minimizing ankle torque is important because typically the ankle torque is more constrained than others in that it should not cause foot tipping.

The balance controller 100 controls both angular and linear momentum of the robot for balance maintenance. The control policy is defined in terms of the desired momentum, which allows for different variations of the balance controller 100. For example, different embodiments of the balance controller 100 can satisfy linear and angular momentum in different proportions, as the situation demands. Desired foot GRF and foot CoP are directly computed without requiring the balance controller 100 to compute the net GRF and net CoP. Thus, the balance control framework is applicable to non-level ground at each foot without any special treatment. For double support, the balance controller 100 computes foot GRFs and foot CoPs that minimize the ankle torques.

Beneficially, the balance controller 100 generates a control signal 104 that enables a single or double-supported robot to maintain balance when subjected to pushing various directions. Furthermore, the robot can maintain balance when two feet are on separate moving supports with different inclinations and velocities. Furthermore, the balance controller 100 can be used for stepping motions.

Momentum-Based Balance Control Process

Figure 3:
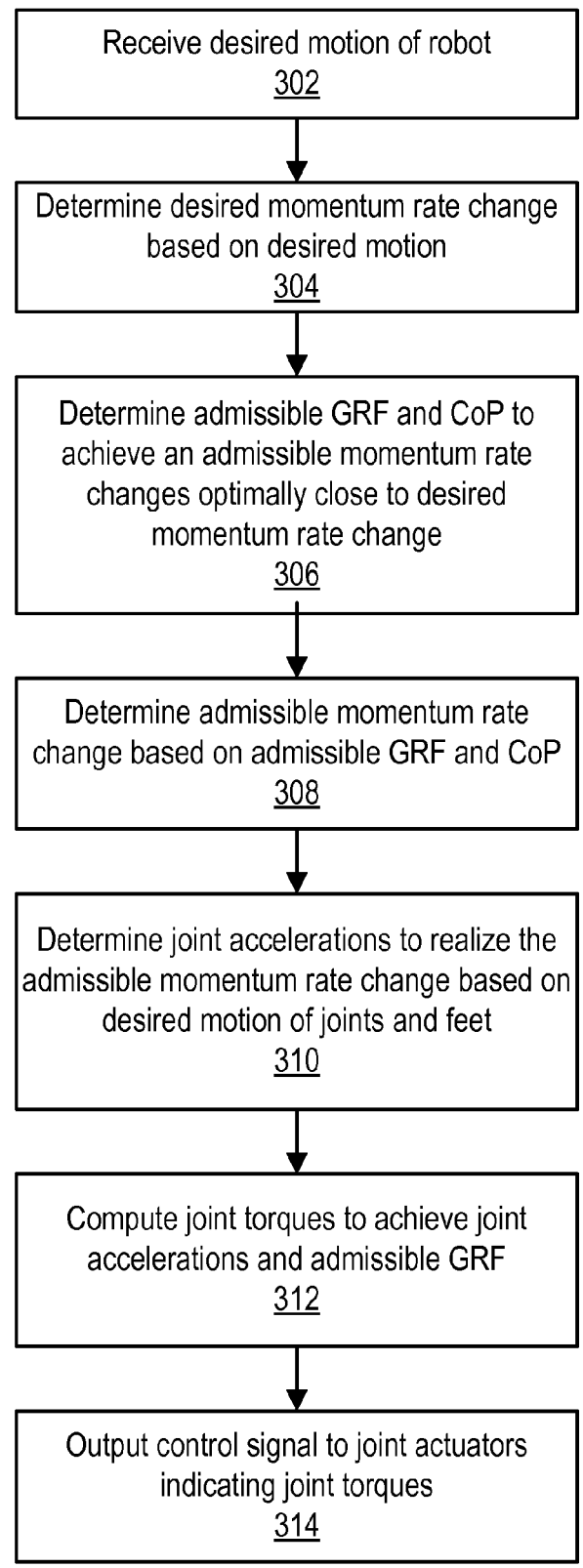
FIG. 3 is a flowchart illustrating a process for controlling a humanoid robot in accordance with an embodiment of the invention.

FIG. 3 is a flowchart illustrating the high-level process performed by the balance controller 100, details of which are described in further detail below. In summary, the balance controller 100 first receives 302 as an input the desired motion 102 of the robot. In one embodiment, for example, the desired motion 102 is represented as desired angular momentum $k_d$, desired center of mass (CoM) position $r_{G,d}$, desired center of mass velocity, $\dot{r}_{G,d}$, desired joint accelerations $\ddot{\theta}_d$, desired foot configuration $T_d$, and desired foot velocity $v_d$. From the desired motion 102, the balance controller determines 304 desired angular momentum rate change $\dot{k}_d$ and desired linear momentum rate change $\dot{l}_d$ (collectively referred to herein as desired momentum rate change). Next, the balance controller 100 determines 306 admissible foot ground reaction forces (GRFs) and foot center of pressures (CoPs) from the desired momentum rate change. The admissible foot GRF and foot CoPs are constrained based on balance constraints (e.g., the admissible CoP may be constrained to the area under the support base or the robot may topple over). Thus, the admissible foot GRF and foot CoPs may not precisely result in the desired momentum rate change if the robot is not physically capable of producing the desired momentum rate change while still maintaining balance. Instead, the admissible foot GRF and foot CoPs result in an admissible momentum rate change that is optimally close to the desired momentum rate change under the imposed constraints. The admissible momentum rate change is determined 308 from the admissible foot GRF and foot CoPs. The balance controller 100 determines 310 joint accelerations that will achieve the admissible momentum rate change based on the desired motion of joints and feet. The balance controller 100 then determines 312 joint torques to achieve the joint accelerations and the admissible foot GRF. The balance controller 100 then sends 314 a control output 104 to joint actuators 150 that cause the robot joints to move according to the determine joint torques. Each of the process steps above are now described in further detail below in the context of an example implementation of the balance controller 100.

A. Control Framework

The configuration of a humanoid robot may be represented as $Q = (T_0, \theta) \in SE(3) \times \mathbb{R}^n$ where $T_0(R_0, p_0) \in SO(3) \times \mathbb{R}^3$ denotes the base frame (trunk) configuration and n is the total number of joint DoFs. The subscripts 0 and s denote the base frame and joints, respectively, with s implying "shape" associated with the joint angles in geometric dynamics. The total DoFs of the robot is thus 6+n, because the floating base has 6 DoFs. The generalized velocity can be written as $\dot{q} = (v_0, \dot{\theta}) \in \mathbb{R}^{6+n}$ where $v_0 = (\omega_0, v_0)$ is the spatial velocity of the trunk with respect to the body frame and expressed as:

$$[\omega_0] = R_0^T \dot{R}_0 \quad (3)$$

$$v_0 = R_0^T \dot{p}_0 \quad (4)$$

Then, the constraint equations due to ground contacts and the joint space equations of motion of the robot are as follows:

$$0 = J(Q)\dot{q} \quad (5)$$

$$\tau = H(Q)\ddot{q} + c(Q, \dot{q}) + \tau_g(Q) - J^T f_c \quad (6)$$

where $\tau \in \mathbb{R}^{6+n}$ denotes the generalized forces, H is the joint space inertia matrix, c includes Coriolis, centrifugal, and damping forces, and $\tau_g$ is the gravity torque. $f_c$ is a vector representing external "constraint" forces from the ground, determined by foot GRFs and CoPs, and the Jacobian J transforms $f_c$ to the generalized forces. The dimension of $f_c$ depends on the nature of constraint at the foot-ground contact. For example, for single support $f_c$ is 6×1 (3 for force and 3 for torque) whereas for double support, when a non-slipping planar contact between the foot and the ground is maintained, it is 12×1.

Since the robot base is free floating, the first six elements of $\tau$ are zero, i.e., $\tau^T = [0^T \tau_s^T]$. Hence, (6) can be divided into two parts, one corresponding to the base, denoted by the subscript 0, and the other, subscripted with s, for the joints. Then (5) and (6) are rewritten as follows:

$$0 = J\ddot{q} + \dot{J}\dot{q} \quad (7)$$

$$0 = H_0 \ddot{q} + c_0 + \tau_{g,0} - J_0^T f_c \quad (8)$$

$$\tau_s = H_s \ddot{q} + c_s + \tau_{g,s} - J_s^T f_c \quad (9)$$

where (7) is the differentiation of (5). In view of the framework above, the balance controller 100 determines the control torques $\tau_s$ to control dynamics of the robot and maintain balance.

Due to the high DoFs of humanoid robots, one embodiment of the balance controller 100 solves an optimization problem. However, the computational cost of the optimization increases rapidly as the dimension of the search space increases. Even the simplest optimization problem such as the least-squares problem has order $O(n^3)$ time complexity. Therefore, for improved computational efficiency, a sequential approach may be used. In this approach, the balance control problem is divided into smaller sub-problems, which can be solved serially. Moreover, by computing $f_c$ and $\ddot{q}$ first, an efficient linear-time algorithms for inverse dynamics can be used, without having to compute the joint space equations of motion (6) which has a quadratic time complexity.

B. Desired Momentum for Balance Controller

After receiving 302 the desired motion 104, the balance controller 100 determines 304 the desired angular and linear momentum rate changes $\dot{k}_d$ and $\dot{l}_d$. In various alternative embodiments, the desired rotational behavior may be defined in terms of the CoP instead of angular momentum. Although the GRF-CoP combination has a one-to-one relationship with momentum rate changes, their significance regarding balance are very different. Whereas the GRF and CoP characterize the magnitude, direction and point of application of the external forces, the momentum rate changes describe the resulting motion of a robot. The unilateral nature of robot-ground contact and friction limits impose important direct constraints on the range of GRF and CoP. These influence the achievable range of momentum rate change, but only indirectly. On the other hand, it is more natural to describe the aggregate motion of a robot in terms of momentum. Therefore, in the described embodiment, the controller 100 uses momentum as control objectives and uses GRF and CoP as constraints. The overall behavior of the robot against external perturbations is determined by the desired momentum rate change. In one embodiment, the balance controller 100 employs the following feedback control policy:

$$\dot{k}_d = \Gamma_{11}(k_d - k) \quad (10)$$

$$\dot{l}_d/m = \Gamma_{21}(\dot{r}_{G,d} - \dot{r}_G) + \Gamma_{22}(r_{G,d} - r_G) \quad (11)$$

where $\dot{k}_d$ and $\dot{l}_d$ are the desired rates of change of centroidal angular and linear momentum, respectively, m is the mass of the robot, $r_{G,d}$ is the desired CoM position, k is the actual angular momentum of the robot, $r_G$ is the actual CoM position of the robot, and $\dot{r}_G$ is the actual CoM velocity of the robot. $\Gamma_{ij}$ represents a 3×3 diagonal matrix of feedback gain parameters that may be experimentally determined. For example, in one embodiment $\Gamma_{11} = \text{diag}\{5, 5, 5\}$, $\Gamma_{21} = \text{diag}\{40, 20, 40\}$, and $\Gamma_{22} = \text{diag}\{8, 3, 8\}$. Note that unlike the linear position feedback term in (11), there is no angular position feedback in (10). This is because a physically meaningful angular "position" cannot be defined corresponding to angular momentum. For postural balance maintenance experiments (i.e., the desired linear and angular momentum are zero and it is desired that the robot stands still), $k_d$ and $r_{G,d}$ are set to zero and $r_{G,d}$ to the mid-point of the geometric centers of the two feet. For other cases where the robot is in motion, the desired motion 104 may include non-zero $k_d$ and $r_{G,d}$.

Various sensors may be used to directly measure k, $r_G$, and $\dot{r}_G$, or the controller 100 may derive k, $r_G$, and $\dot{r}_G$ from other measurable quantities and known robot parameters (e.g., the mass and geometry of each link). For example, in one embodiment, each joint of the robot has a position encoder which supplies joint position data (e.g., joint angle) to the controller 100. The controller 100 may apply time differentiation to the joint position data to obtain joint velocities (e.g., angular velocities). Additionally, the robot's trunk may be equipped with an internal gyroscope and accelerometer. The gyroscope measures trunk angular velocity, which the controller 100 can integrate to obtain the trunk's angular position. The accelerometer generates linear acceleration of the trunk, which the controller 100 can integrate to obtain the trunk's linear velocity, and twice integrate to obtain the trunk's linear position. The controller 100 can compute k, $r_G$, and $\dot{r}_G$ from one or more the various types of sensed data. In alternative embodiments different types of sensors may be used to derive the measured quantities. For example, in one embodiment, the robot may be equipped with force sensitive skin that can directly measure applied forces, and these measured forces can be used to determine k, $r_G$, and $\dot{r}_G$.

In one embodiment, the robot also has a force sensor in each foot. Each force sensor measures the GRF, which includes three components of linear force and three components of torque. Alternatively, the controller 100 can compute GRF indirectly through the observed dynamics.

C. Admissible Foot GRF, Foot CoP, and Momentum Rate Change

Given the desired momentum rate changes, $\dot{k}_d$ and $\dot{l}_d$, the balance controller 100 determines 306 admissible foot GRF and CoP such that the resulting momentum rate change (i.e., the admissible momentum rate change) is as close as possible to the desired values. A desired momentum rate change may not be admissible, for example, because it would require a desired CoP, $p_d$, that is outside the robot's support base, and attempting to implement the desired momentum rate change would therefore cause the robot to topple over. Furthermore, the GRF must be unilateral in nature, and must not attract the robot towards the ground. Furthermore, the robot may not be able to achieve desired momentum rate changes, $\dot{k}_d$ and $\dot{l}_d$ that are outside the robot's physical capabilities (e.g., if the desired momentum rate changes, $\dot{k}_d$ and $\dot{l}_d$ would require an actuator to produce a torque greater than it is capable of producing or a limb would be required to demonstrate a motion outside its physical range). Thus, the robot is constrained by its admissible CoP and its admissible GRF, which in turn may limit the desired momentum rate change to an admissible momentum rate change. The balance controller 100 determines the optimal foot GRF and foot CoP that will create the admissible momentum rate change, as close as possible to the desired momentum rate change.

1) Prioritization Between Linear and Angular Momentum

If the desired foot GRF and foot CoP are not admissible, it is not physically possible to generate the desired momentum rate changes and still maintain balance. In this case, the balance controller 100 may strike a compromise and decide which quantity out of $\dot{k}$ and $\dot{l}$ is more important to preserve.

Figure 4A:
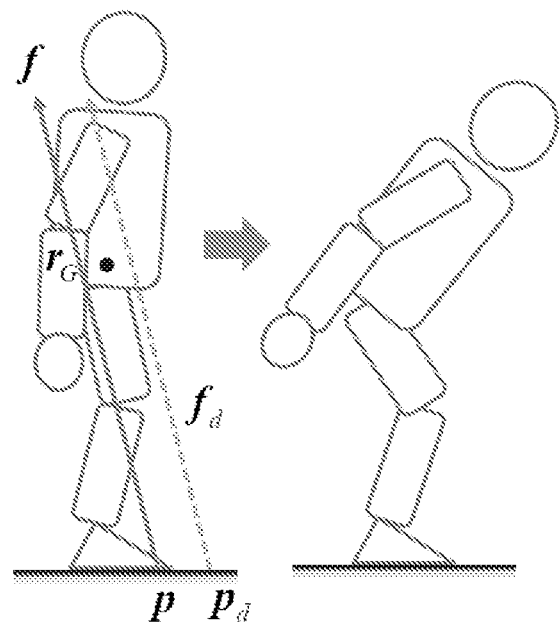
FIG. 4A is a diagram illustrating a trunk rotation of the robot in response to a push in accordance with an embodiment of the invention.
Figure 4B:
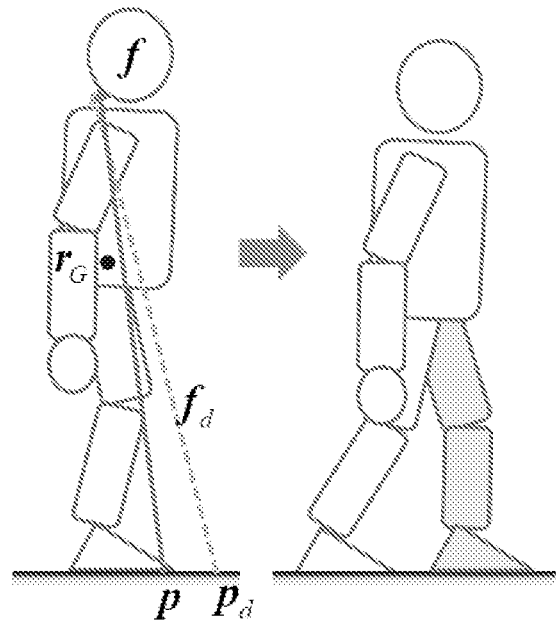
FIG. 4B is a diagram illustrating a forward step of the robot in response to a push in accordance with an embodiment of the invention.

FIGS. 4A-4B illustrate such a case where the desired CoP, $p_d$, computed from the desired momentum rate change is outside the support base, indicating that it is not admissible. FIGS. 4A and 4B show two different approaches to this problem. In each of these examples, $k_d$ and $\dot{r}_{G,d}$ are set to zero and $r_{G,d}$ to the mid-point of the geometric centers of the two feet (i.e., the desired motion 104 indicates that the robot should remain stationary). However, the robot is subjected to an external force (e.g., a push), thus causing the robot's actual measured motion (e.g., $k$, $r_G$, and $\dot{r}_G$ discussed above) to vary from the desired motion 104. Applying (10) and (11) above, the controller 100 determines the desired momentum rate changes, $\dot{k}_d$ and $\dot{l}_d$ that will cause the robot to achieve the desired motion 104 in view of the observed motion. However, the desired rate changes, $\dot{k}_d$ and $\dot{l}_d$ may not be admissible. Thus, although it is desired for the robot to remain stationary, the robot may have to move in order to maintain balance and avoid falling over.

Under the first solution illustrated in FIG. 4A, the desired CoP location, $p_d$, is translated to the closest point of the support base resulting in an admissible CoP location, p. The magnitude and line of action of the desired GRF $f_d$ is unchanged in the resulting admissible GRF f. In this case the linear momentum objective of the desired motion 102 is satisfied (i.e., the CoM remains stationary) but the angular momentum objective is somewhat compromised. If the angular momentum was not compromised, the robot may topple over because the desired CoP location $p_d$ is outside the support base. The behavior emerging from this solution is characterized by a trunk rotation. This strategy can be observed in the human when the trunk yields in the direction of the push to maintain balance.

Under the second solution illustrated in FIG. 4B, in addition to translating the desired CoP, $p_d$, to the support base resulting in an admissible CoP, p, as before, the direction of the desired GRF $f_d$ can be rotated resulting in the admissible GRF f. Under this solution, the angular momentum objective is satisfied (i.e., the robot does not perform a trunk rotation), but the linear momentum objective is compromised. In this case, the robot moves linearly along the direction of the applied force due to the residual linear momentum, making it necessary to step forward to prevent falling.

In one embodiment, the controller implements the first solution as illustrated in FIG. 4A, giving higher priority to preserving linear momentum over angular momentum because this solution increases the capability of the postural balance (i.e., the robot can maintain balance without involving a stepping). In another embodiment, the controller dynamically chooses one of the two strategies depending on the environment conditions and the status of the robot. In yet other embodiments, a compromise between the two strategies may be implemented thus compromising both linear and angular momentum, but each to a lesser degree.

2) Single Support Case:

Dealing with single support case is straightforward because the foot GRF and CoP are uniquely determined from the desired momentum rate change, from (1) and (2) as follows:

$$f_d = \dot{l}_d - mg \tag{12}$$

$$p_{d,X} = r_{G,X} - \frac{1}{\dot{l}_{d,Y} - mg}(f_{d,X} r_{G,Y} - \dot{k}_{d,Z}) \tag{13}$$

$$p_{d,Z} = r_{G,Z} - \frac{1}{\dot{l}_{d,Y} - mg}(f_{d,Z} r_{G,Y} + \dot{k}_{d,X}) \tag{14}$$

where the Y-axis is parallel to the direction of gravity vector, i.e., $g=(0, g, 0)$. If $f_d$ and $p_d$ computed above are valid, these values are computed directly. Otherwise, as mentioned previously, the controller gives higher priority to linear momentum. If $f_d$ is outside the friction cone, $f_d$ is first projected onto the friction cone to prevent foot slipping.

Figure 5:
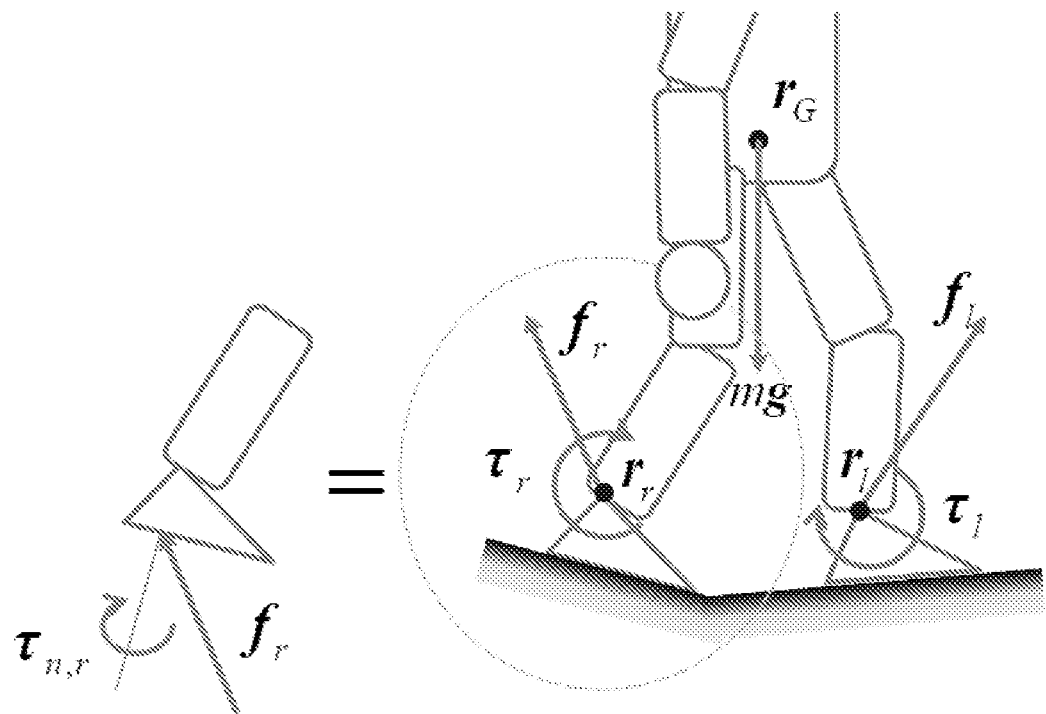
FIG. 5 is a free body diagram illustrating forces on feet of the robot in accordance with an embodiment of the invention.

3) Double Support Case:

Determining foot GRFs and foot CoPs for double support is more involved. (1) and (2) may be rewritten for the double support case. Here, the GRF at each foot is expressed in terms of the forces and torques applied to the corresponding ankle. A free body diagram illustrating this concept is shown in FIG. 5. By representing the GRF applied to each foot with respect to the local frame of the foot located at the ankle, the moments $\tau_r$, $\tau_l$ applied to the ankle by the foot GRFs $f_r$ and $f_l$ can be factored out. $r_r$ and $r_l$ are the positions of the ankles. The benefit of this representation is that the torques applied to the ankles may be explicitly expressed.

$$\dot{k} = \dot{k}_f + \dot{k}_\tau \tag{15}$$

$$\dot{k}_f = (r_r - r_G) \times f_r + (r_l - r_G) \times f_l \tag{16}$$

$$\dot{k}_\tau = \tau_r + \tau_l \tag{17}$$

$$\dot{l} = mg + f_r + f_l \tag{18}$$

In (15), $\dot{k}$ is divided into two parts: $\dot{k}_f$ due to the ankle force, and $\dot{k}_\tau$ due to ankle torque. Thus, ankle torques may be taken into account in determining foot GRFs. $f_r$ and $f_l$ are the GRFs at the right and left foot, respectively, and $r_r$, $r_l$ are the positions of the body frames of the foot, located at the respective ankle joints. The ankle torques $\tau_i$, (i=r,l) are expressed in terms of foot GRF and foot CoP as follows:

$$\tau_i = R_i(d_i \times f_i + \tau_{n,i}) \tag{19}$$

where $R_i$ is the orientation of the foot, $d_i$ is the foot CoP in body frame, and $\tau_{n,i}=(0, 0, \tau_{n,i})$ is the normal torque in body frame.

Figure 6:
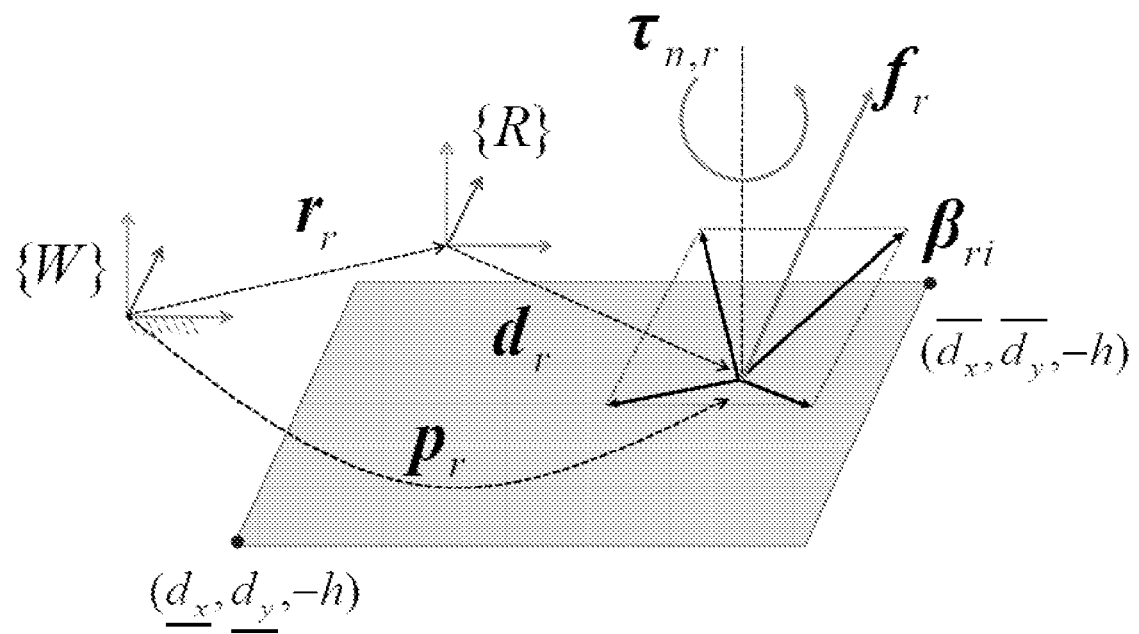
FIG. 6 is a diagram illustrating a representation of forces applied to the feet of the robot in accordance with an embodiment of the invention.

A diagram illustrating this representation is shown in FIG. 6. The pressure from the ground to the right foot is representing using CoP, denoted by $d_r$ in the right foot frame $\{R\}$, a vertical moment $\tau_{v,r}$, and the GRF $f_r$. $f_r$ is represented with four basis vectors $\beta_{rj}$ ($j=1 \ldots 4$) that approximate the friction cone of the ground, i.e., $f_r = \Sigma_j \beta_{rj} \rho_{rj}$, where $\rho_{rj}$ ($\geq 0$) is the magnitude in the direction of $\beta_{rj}$. Therefore, the ground pressure is defined by 7 parameters, $\{\rho_{r1}, \ldots, \rho_{r4}, d_{rx}, d_{ry}, m_{v,r}\}$. This representation is compact, having only one more parameter than the minimum (3 for force and 3 for torque), and constraint can be expressed in a very simple form for a rectangular convex hull of the foot sole, i.e., $\rho_j \geq 0$, $\underline{d_j} \leq d_j \leq \overline{d_j}$ and $|\tau_n| < \mu f_{r,z}$. $\mu$ is a friction coefficient and h is the height of foot frame from the foot sole.

Given $\dot{k}$ and $\dot{l}$, solving for foot GRFs and foot CoPs is an underdetermined problem. Thus, additional optimality criteria may be prescribed to find a solution. By incorporating minimal ankle torques into the optimal condition, the objective function can be expressed as follows:

$$\omega_l \|\dot{l}_d - \dot{l}(f_r,f_l)\|^2 + \omega_k \|\dot{k}_d - \dot{k}(f_r,f_l,\tau_r,\tau_l)\|^2 + \omega_f(\|f_r\|^2 + \|f_l\|^2) + \omega_\tau (\|\tau_r\|^2 + \|\tau_l\|^2) \text{ s.t. } f_i \text{ and } \tau_i \text{ are admissible} \quad (20)$$

where the first two terms aim to achieve the desired momentum rate change, the third term regularizes foot GRFs, and the last term tries to minimize ankle torques. $\omega$'s are weighting factors among the different objectives.

Due to the cross product form of $f_i$ and $d_i$ in (19), minimizing (20) is a nonlinear problem. For improved computational efficiency, one solution is to convert this general nonlinear optimization problem to easier ones that can be solved using least-squares or quadratic programming methods. This can be achieved by expressing the foot GRF and foot CoP using the forces at sample contact points. However, a trade-off to this approach is that it increases the dimension of the search space significantly. For example, in one in one embodiment, GRF and CoP of one can be modeled using 16 variables to model the GRF and CoP of one foot, which is 10 more variables than the dimension of the unknowns.

Alternatively, instead of increasing the search space to make the optimization problem easier, (20) can be approximated with two constrained least-squares problems, one for determining the foot GRFs, and the other for determining the foot CoPs. This way the number of variables is kept small. Additionally, the ankle torques may be minimized. Minimizing ankle torques is meaningful because they are limited more severely than other joint torques due to the unilateral nature of contact. In order to minimize the ankle torques ($\dot{k}_\tau \rightarrow 0$), the foot GRFs $f_r$ and $f_l$ should create $\dot{k}_f$ as close to the desired angular momentum rate change ($\dot{k}_f \rightarrow \dot{k}_d$) as possible while satisfying $\dot{l}_d$. If $\dot{k}_f = \dot{k}_d$, the ankle torques can vanish. If $\dot{k}_f \neq \dot{k}_d$, the ankle torques are determined to account for the residual angular momentum rate change, $\dot{k}_d - \dot{k}_f$.

a) Determination of Foot GRFs

The solution to the optimization problem below yields the foot GRFs, $f_r$ and $f_l$:

$$\min \|\dot{l}_d - \dot{l}(f_r,f_l)\|^2 + \omega \|\dot{k}_d - \dot{k}_f(f_r,f_l)\|^2 + \epsilon(\|f_r\|^2 + \|f_l\|^2) \quad (21)$$

where $\omega$ and $\epsilon$ ($\omega \gg \epsilon > 0$) are weighting factors for angular momentum and the magnitude of foot GRFs, respectively that may be experimentally determined. For example, in one embodiment, $\omega=0.1$ and $D\!f=0.01$. Note that if $\dot{k}_d = \dot{k}_f$, the ankle torques $\tau_i$ become zero. Each foot GRF is modeled using four basis vectors $\beta_{ij}$ and their magnitudes $\rho_{ij}$ that approximate the friction cone (an inverted pyramid in FIG. 6) on the ground:

$$f_i = \sum_{j=1}^{4} \beta_{ij} \rho_{ij} := \beta_i \rho_i \quad (22)$$

where $\beta_i = [\beta_{i1} \ldots \beta_{i4}]$.

Note that $r_r$ and $r_l$ are determined by the configuration of the robot; they are constants when solving this problem. Therefore $\dot{k}_f$ becomes a linear equation of $\rho_i$ when (22) is substituted into (16). Rearranging into a matrix equation, the optimization problem (21) is turned into a linear least squares problem with non-negativity constraints where the only unknowns are the $\rho_i$:

$$\min \|\Phi \rho - \xi\|^2 \text{ s.t. } \rho_i \geq 0 \quad (23)$$

where:

$$\Phi = \begin{bmatrix} \beta_r & \beta_l \\ \omega \delta_r & \omega \delta_l \\ \epsilon 1 \end{bmatrix}, \xi = \begin{bmatrix} \dot{l}_d - mg \\ \omega \dot{k}_d \\ 0 \end{bmatrix} \quad (24)$$

$$\rho = [\rho_r^T \rho_l^T] \quad (25)$$

$$\delta_i = [r_i - r_G] \beta_i \quad (26)$$

(23) can be solved using a Non-Negative Least-Squares algorithm, which has the merit of not requiring parameter tuning b) Determination of Foot CoPs Usually, the desired angular momentum rate change cannot be generated only by $f_r$ and $f_l$, so the residual $\dot{k}_{\tau,d} = \dot{k}_d - \dot{k}_f$, should be generated by the ankle torques. To this end, local CoP of each foot is determined such that they create $\dot{k}_{\tau,d}$ while minimizing each ankle torque. It is to be noted that, after fixing $f_i$, (19) can be written as a linear function of $d_i$ and $\tau_{n,i}$:

$$\tau_i = [-f_i] R_i d_i + R_i \tau_{n,i} \quad (27)$$

so that the optimization problem can be expressed as a least squares problem with upper and lower constraints:

$$\min \|\Phi \eta - \kappa\|^2 \text{ s.t. } \underline{\eta} \leq \eta \leq \overline{\eta} \quad (28)$$

where $$\Psi = \begin{bmatrix} \Psi_k \\ \epsilon 1 \end{bmatrix}, \kappa = \begin{bmatrix} \dot{k}_{\tau,d} \\ \epsilon \eta_d \end{bmatrix} \quad (29)$$

$$\eta = [d_{r,x} d_{r,Y} \tau_{n,r} d_{l,x} d_{l,Y} \tau_{n,l}]^T \quad (30)$$

where the elements of the constant matrix $\Phi_k \in R^{3 \times 6}$ are determined from (27). $\underline{\eta}$ and $\overline{\eta}$ are determined from foot geometry, friction coefficient, and the normal component of foot GRF as illustrated in FIG. 5. $\eta_d$ is chosen such that $\tau_i$ is zero, i.e., the line of action of $f_i$ intersects the ankle Eq. (28) may be solved using an appropriate method, such as, for example, the Levenberg-Marquardt method, or other known methods. Note that both the least squares problems have a small number of variables, so the optimization can be carried out quickly.

4) Admissible Momentum Rate Change:

After determining admissible foot GRF and foot CoP, the admissible momentum rate change $\dot{h}_\alpha$ is also computed using (1) and (2), or (15) and (18) for double support.

D. Determination of Joint Accelerations and Torques

After determining the admissible foot GRFs, foot CoPs, and momentum rate change, the balance controller 100 determines 310 the joint accelerations that will generate the admissible momentum rate change as well as the foot contact constraints. Then, the controller determines 312 necessary joint torques to create the joint accelerations and the external forces using inverse dynamics.

First, the desired joint accelerations $\ddot{q}$ are resolved for balance such that they satisfy (7) and a variation of (8). The spatial centroidal momentum $h=[k^T l^T]^T$ can be expressed in terms of the generalized velocities:

$$h = A(Q)\dot{q} \tag{31}$$

where $A \in \mathbb{R}^{6 \times (6+n)}$ is the centroidal momentum matrix that linearly maps the generalized velocities to the spatial momentum. Differentiating (31), derives:

$$\dot{h} = A\ddot{q} + \dot{A}\dot{q} \tag{32}$$

After replacing $\dot{h}$ with external forces using Newton's law (refer to (1) and (2)), the aggregate motion of the dynamic system due to the external forces is expressed, which is the same as what (8) represents (note that the joint torques are not included in (8)). The only difference is the reference frame: (32) is expressed with respect to a frame at the CoM whereas (8) is written with respect to the base frame.

In this embodiment, (32) is used because the balance controller defines its objectives in terms of centroidal momentum. Specifically, the balance controller 100 computes the output accelerations $\ddot{\theta}_\alpha$ such that they minimize the following objective function:

$$\omega \|\dot{h}_\alpha - A\ddot{q} - \dot{A}\dot{q}\| + (1-\omega)\|\ddot{\theta}_d - \ddot{\theta}\| \tag{33}$$

$$\text{s.t. } J\ddot{q} + \dot{J}\dot{q} = \alpha_d$$

where $\dot{h}_\alpha$ is the admissible momentum rate change and $\ddot{\theta}_d$ specifies the desired joint acceleration, which may describe the desired motions of the upper body. The parameter $\omega$ controls the relative importance between the balance objective (the first term) and the prescribed motion objective associated with the kinematic task (the second term). $\alpha_d = [\alpha_{d,r}^T \alpha_{d,l}^T]^T$ is the desired accelerations of the right and left feet, which will be described in further detail below.

Overall, (33) can be viewed as an inverse kinematics problem with three task objectives: momentum rate change, style, and contact constraints. By treating (7) as a hard constraint, it has a higher priority over the others. (33) is solved by converting it to a least-squares problem with linear equality constraints.

Finally, the feedforward torque input $\tau_{ff}$ is computed from $\ddot{\theta}_\alpha$ and the admissible external forces by performing inverse dynamics. In one embodiment, the hybrid system dynamics algorithms may be used, which is useful for performing inverse dynamics for floating base mechanisms. Since external forces are explicitly specified for all the links contacting the ground, the robot can be treated as an open loop system even when multiple links are in contact with the ground, thereby making it possible to use the inverse dynamics algorithm for open-loop systems.

Overall torque input is determined by adding feedback terms:

$$\tau_s = \tau_{ff} + \tau_{fb} \tag{34}$$

where $\Gamma_p = \text{diag}(\gamma_{p,i})$ and $\Gamma_d = \text{diag}(\gamma_{d,i})$ are proportional and derivative gains, respectively. Position and velocity commands $\theta^*, \dot{\theta}^*$ are determined from the time integration of $\ddot{\theta}_\alpha$.

E. Desired Motion of the Feet

As described above, the desired motion of the feet acts as an input to the balance controller. In one embodiment, the desired foot accelerations ad are set such that each foot has the desired configuration $T_d \in SE(3)$ and velocity $v_d \in se(3)$. Specifically, for each foot, zwe use the following feedback rule:

$$\alpha_{d,i} = k_p \log(T_i^{-1} T_{d,i}) + k_d (v_{d,i} - v_i) \tag{36};$$

for $l \in \{r,l\}$ where $k_p$ and $k_d$ are proportional and derivative feedback gains, respectively. The log:SE(3)→se(3) function computes the twist coordinates corresponding to a transformation matrix. The configuration T and velocity v of a foot can be computed from the forward kinematics operation assuming that the robot can estimate the configuration and velocity of the trunk, e.g., from an accelerometer and a gyroscope. For a stationary support foot, the values can be trivially set as $v_d = 0 = 0$ and $T_d = T$.

Thus, the balance controller 100 controls a humanoid robot to maintain balance on non-level, non-continuous, and non-stationary grounds. By controlling both linear and angular momentum of the robot, the balance controller 100 allows the robot to maintain balance under relatively large perturbations and respond to such perturbations with human-like balancing behavior. By determining the CoP and GRF at each support foot without using the traditional net CoP and net GRF of the robot, the balance controller 100 can deal with different ground geometry and ground frictions at each foot.

Applications of the Balance Controller

Applying the control framework above, the balance controller 100 is able to control the robot to maintain balance under a wide variety of conditions, and to achieve such balance corrections in a human-like manner. FIGS. 7-10 illustrate motion of the robot when subjected to various perturbations and/or when standing on non-level or non-stationary supports. In each of these examples, the desired motion 102 of the robot is stationary, i.e., the robot is ideally stationary and moves only as necessary to maintain balance. FIG. 11 illustrates motion of the robot when the desired motion 102 is a stepping in place pattern.

Figure 7:
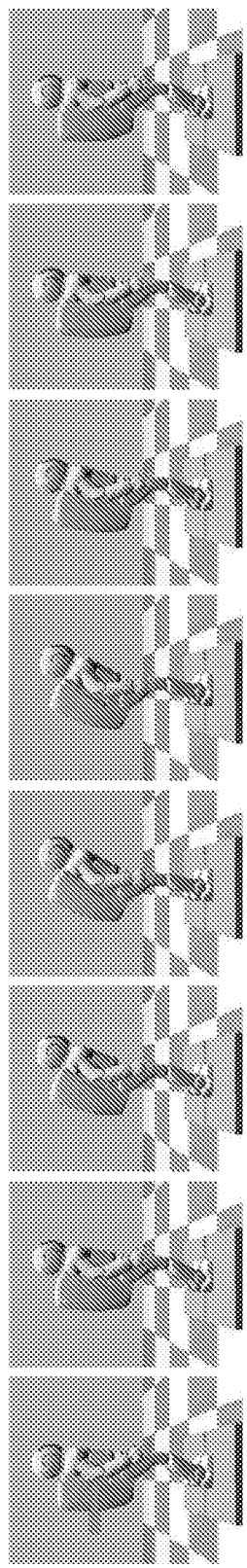
FIG. 7 is a diagram illustrating a response of the robot to maintain balance following a forward push in accordance with an embodiment of the invention.
Figure 8:
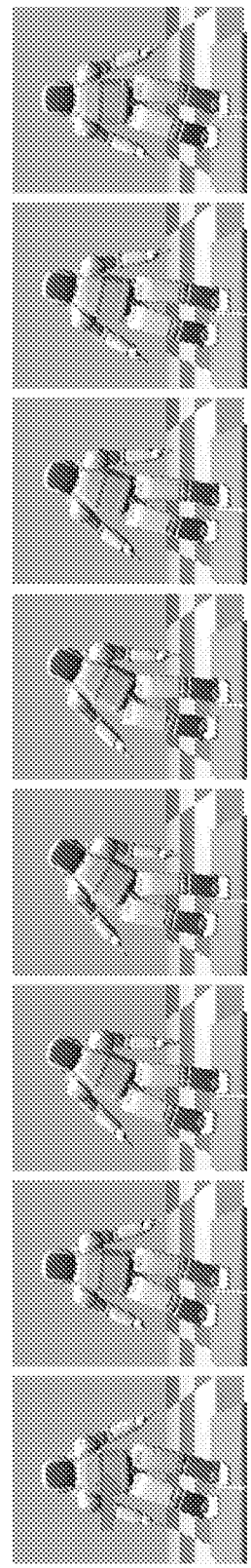
FIG. 8 is a diagram illustrating a response of the robot to maintain balance following a side push in accordance with an embodiment of the invention.
Figure 9:
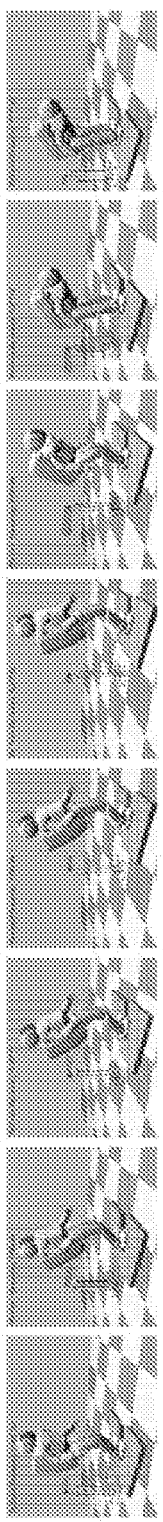
FIG. 9 is a diagram illustrating a response of the robot to maintain balance following a forward push while standing on non-level ground accordance with an embodiment of the invention.

In a first scenario, the robot may be subjected to a push from various directions while the robot is standing on stationary support. The directions, magnitudes, and the locations of the push are all unknown to the balance controller 100. The only sensory information known to the balance controller 100 is the position and velocity of the robot links. When the push magnitude is small, the desired GRF and CoP computed from (10) and (11) are both admissible, and thus the robot may be able to achieve the desired values for both linear and angular momentum. When the perturbation is larger, the desired values may be different from the admissible values, and in order to maintain balance without stepping, the balance controller 100 tries to preserve the CoM location by modulating angular momentum through a rotation of the upper body. The resulting motion of the robot is similar to that of a human rotating the trunk in the direction of the push to maintain balance FIG. 7 shows a series of snapshots illustrating the robot's reaction when the robot is subjected to an external push (e.g., a push subjecting the robot to a force of 120 N for 0.1 sec) applied at the CoM in the forward direction. As can be seen, the robot rotates the trunk forward temporarily to absorb the force before returning to the stationary position. FIG. 8 shows the balance control behavior when the single supported robot is pushed laterally. In this case the robot maintains balance by rotating the trunk in the coronal plane. Although compared to double support, the range of admissible CoP location is smaller during single-support, it is possible to create larger angular momentum through swing leg movement. Again, the robot is seen rotating temporarily in the direction of the push to avoid falling over and then returns to the stationary position.

In a second scenario, the balance controller 100 allows the robot to maintain balance on non-level and/or non-stationary supports. In a first example illustrated in FIG. 9, the two feet of the robot are supported on two surfaces of different inclination angles (e.g., +X degrees and −Y degrees) and they receive continuous independent perturbations. Here, the robot periodically generates fairly large trunk rotations to maintain balance. In this particular example, the trunk of the robot allows a larger range of motion in flexion than in extension, and therefore the robot bends forward more than backward.

Figure 10:
FIG. 10 is a diagram illustrating a response of the robot to maintain balance while standing on a non-stationary platform in accordance with an embodiment of the invention.
Figure 11:
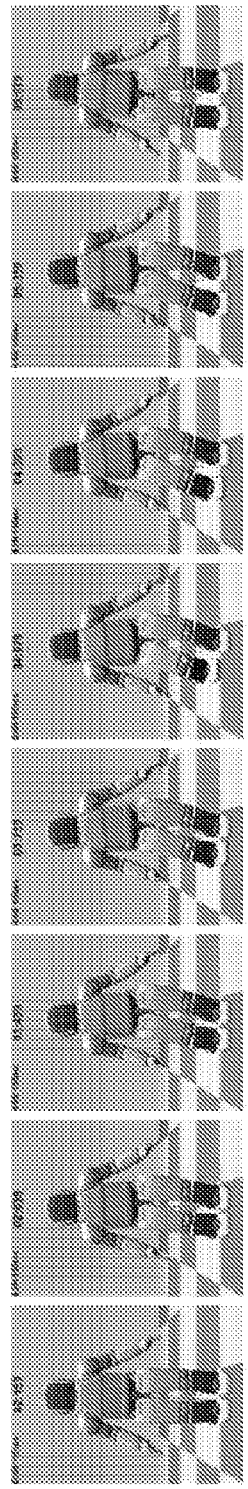
FIG. 11 is a diagram illustrating a robot maintaining balance while executing a stepping in place motion in accordance with an embodiment of the invention.

In FIG. 10 the two foot supports not only have different inclination angles (e.g., ±10 degrees) but are translating back and forth with out of phase velocities: when one support moves forward, the other moves backward. In one embodiment, when a foot rests on a moving support, the motion of the support is estimated to set the desired motion of the foot properly. For example, in one embodiment, if the measured CoP is inside the safe region of the support foot, then the balance controller 100 assumes that the foot is not tipping but stably resting on the moving support. In this case, the desired configuration and velocity of the support foot is updated to its current configuration and velocity, i.e., $v_d=v$ and $T_d=T$. The desired horizontal location of CoM is set to the middle of the geometric centers of the two feet, and the desired velocity of CoM is set to the mean velocity of the two feet.

In another scenario, the balance controller 100 allows the robot to maintain balance while in motion (i.e., the desired motion 102 is non-zero). For example, FIG. 11 illustrates motion of the robot when then desired motion 102 comprises a stepping in place pattern. In this embodiment, the desired motion 102 comprises a sequence of six finite states, in which each state specifies the target CoM location and the configurations of the swing foot, both described with respect to the support foot. Throughout each state, the desired angular momentum and the desired joint angles of the upper body is set to zero. Given the target pose, the robot determines the desired configurations and velocities of CoM and swing foot at each control time step to reach the target configurations. The state transition occurs when the target configurations are achieved. For example, the pattern may comprise the following steps: first, the robot moves its CoM $r_G$ above the right foot; second, the robot lifts its right foot by modifying the right foot configuration $T_r$; third, the robot lands the right by changing the right foot configuration $T_r$ and CoM $r_G$; fourth, the robot moves its CoM $r_G$ above the left foot; fifth, the robot lifts the left foot by modifying the left foot configuration $T_l$; and sixth, the robot modifies the left foot configuration $T_l$ and CoM $r_G$ to land the left foot lands. The six steps can repeat indefinitely with the robot maintaining balance throughout.

Additional Alternative Embodiments

In an alternative embodiment, the balance controller 100 is modified to allow the robot on moving platforms to maintain balance even when subjected to a long-duration push. In this embodiment, rather than modulating angular momentum, the balance controller 100 estimates the inertial force, and maintains balance by leaning the body against the accelerating direction of the moving platforms, instead of rotating its trunk.

An advantage of the balance controller 100 described above is that it need not utilize force and torque sensor data when determining the desired and admissible GRF and CoP. Thus, the balance controller 100 is useful in robots not equipped with force-torque sensors. In an alternative embodiment where a humanoid robot is equipped with force-torque sensors at the foot, the balance controller 100 may use the sensory information as a feedback data to help reduce the difference between the actual and desired GRF and CoP. Also, the sensory data could be further used for estimating the direction and magnitude of external perturbations.

Using the momentum-based approach to balance control as described in the various embodiments above, the balance controller 100 is therefore capable of controlling the robot to maintain balance when encountering external perturbations, non-level ground, and/or non-stationary ground. Furthermore, the resulting motions of the robot are modeled after human balance mechanisms, thus allowing the robot to appear human-like in its motions.

Upon reading this disclosure, those of skill in the art will appreciate still additional alternative designs for a momentum-based balance controller, a having the features described herein. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

The invention claimed is:

1. A computer-implemented method for controlling a humanoid robot, the method comprising:
   receiving, by a balance controller apparatus, a desired motion of the humanoid robot;
   determining, by the balance controller apparatus, desired rates of change of linear and angular momentum of the robot based on the desired motion;
   determining, by the balance controller apparatus, if the desired rates of change of linear and angular momentum meet motion constraints of the humanoid robot;
   responsive to determining that the desired rates of change of linear and angular momentum do not meet the motion constraints, translating a desired center of pressure outside the support base of the robot to an admissible center of pressure at a point of the support base closest to the desired center of pressure;
   determining, by the balance controller apparatus, admissible rates of change of linear and angular momentum based on the admissible center of pressure, at least one of the admissible rates of change of linear and angular momentum differing from the desired rates of change of linear and angular momentum to satisfy the constraints of the humanoid robot, the determining comprising: determining, for each foot of the humanoid robot, a ground reaction force (GRF) and a center of pressure (CoP), and minimizing an ankle toque for each of GRF and CoP in connection with a linear least-square algorithm;
   generating, by the balance controller apparatus, a control output indicating joint torques for achieving the admissible rates of change of linear and angular momentum; and
   outputting, by the balance controller, the control output to joint actuators, the joint actuators causing the robot to move according to joint torques.

2. The computer-implemented method of claim 1, wherein the desired motion comprises at least one of desired angular momentum $k_d$, desired center of mass (CoM) position $r_{G,d}$, desired center of mass velocity $\dot{r}_{G,d}$, desired joint accelerations $\ddot{\theta}_d$, desired foot configuration $T_d$, and desired foot velocity $V_d$.

3. The computer-implemented method of claim 1, wherein determining the admissible rates of change of linear and angular momentum comprises:
  determining a desired ground reaction force (GRF) and desired center of pressure (CoP) to achieve the desired rates of change of linear and angular momentum;
  determining an admissible GRF and an admissible CoP by constraining the desired GRF and desired CoP to physically achievable values; and
  determining the admissible rates of change of linear and angular momentum from the admissible GRF and the admissible CoP.

4. The computer-implemented method of claim 3, wherein determining the admissible GRF and the admissible CoP comprises:
  preserving the desired rate of change of linear momentum and modifying the desired rate of change of angular momentum such that the robot rotates its trunk.

5. The computer-implemented method of claim 3, wherein determining the admissible GRF and the admissible CoP comprises:
  preserving the desired rate of change of angular momentum and modifying the desired rate of change of linear momentum such that the robot takes a step.

6. The computer-implemented method of claim 5, wherein determining the admissible GRF and the admissible CoP comprises:
  rotating the GRF angle such that the desired rate of change of angular momentum is preserved.

7. The computer-implemented method of claim 1, wherein the desired motion comprises maintaining a stationary position.

8. The computer-implemented method of claim 1, wherein the robot maintains balance on a non-level or non-stationary surface.

9. A non-transitory computer-readable storage medium for storing computer program instructions for controlling a humanoid robot, the program instructions when executed by a processor cause the processor to perform steps including:
  receiving a desired motion of the humanoid robot;
  determining desired rates of change of linear and angular momentum of the robot based on the desired motion;
  determining, by the balance controller apparatus, if the desired rates of change of linear and angular momentum meet motion constraints of the humanoid;
  responsive to determining that the desired rates of change of linear and angular momentum do not meet the motion constraints, translating a desired center of pressure outside the support base of the robot to an admissible center of pressure at a point of the support base closest to the desired center of pressure;
  determining admissible rates of change of linear and angular momentum based on the admissible center of pressure, at least one of the admissible rates of change of linear and angular momentum differing from the desired rates of change of linear and angular momentum to satisfy the constraints of the humanoid robot, the determining comprising: determining, for each foot of the humanoid robot, a ground reaction force (GRF) and a center of pressure (CoP), and minimizing an ankle toque for each of GRF and CoP in connection with a linear least-square algorithm;
  generating a control output indicating joint torques for achieving the admissible rates of change of linear and angular momentum; and
  outputting the control output to joint actuators, the joint actuators causing the robot to move according to joint torques.

10. The non-transitory computer-readable storage medium of claim 9, wherein the desired motion comprises at least one of desired angular momentum $k_d$, desired center of mass (CoM) position $r_{G,d}$, desired center of mass velocity $\dot{r}_{G,d}$, desired joint accelerations $\ddot{\theta}_d$, desired foot configuration $T_d$, and desired foot velocity $V_d$.

11. The non-transitory computer-readable storage medium of claim 9, wherein determining the admissible rates of change of linear and angular momentum comprises:
  determining a desired ground reaction force (GRF) and desired center of pressure (CoP) to achieve the desired rates of change of linear and angular momentum;
  determining an admissible GRF and an admissible CoP by constraining the desired GRF and desired CoP to physically achievable values; and
  determining the admissible rates of change of linear and angular momentum from the admissible GRF and the admissible CoP.

12. The non-transitory computer-readable storage medium of claim 11, wherein determining the admissible GRF and the admissible CoP comprises:
  preserving the desired rate of change of linear momentum and modifying the desired rate of change of angular momentum such that the robot rotates its trunk.

13. The non-transitory computer-readable storage medium of claim 11, wherein determining the admissible GRF and the admissible CoP comprises:
  preserving the desired rate of change of angular momentum and modifying the desired rate of change of linear momentum such that the robot takes a step.

14. The non-transitory computer-readable storage medium of claim 13, wherein determining the admissible GRF and the admissible CoP comprises:
  rotating the GRF angle such that the desired rate of change of angular momentum is preserved.

15. A balance controller for controlling a humanoid robot, the balance controller comprising:
  at least one processor; and
  a non-transitory computer-readable storage medium storing computer program instructions, the program instructions when executed by the at least one processor causing the at least one processor to perform steps including:
  receiving a desired motion of the humanoid robot;
  determining desired rates of change of linear and angular momentum of the robot based on the desired motion;
  determining, by the balance controller apparatus, if the desired rates of change of linear and angular momentum meet motion constraints of the humanoid robot;
  responsive to determining that the desired rates of change of linear and angular momentum do not meet the motion constraints, translating a desired center of pressure outside the support base of the robot to an admissible center of pressure at a point of the support base closest to the desired center of pressure;
  determining admissible rates of change of linear and angular momentum based on the admissible center of pressure, at least one of the admissible rates of change of linear and angular momentum differing from the desired rates of change of linear and angular momentum to satisfy the constraints of the humanoid robot, the determining comprising: determining, for each foot of the humanoid robot, a ground reaction force (GRF) and a center of pressure (CoP), and minimizing an ankle toque for each of GRF and CoP in connection with a linear least-square algorithm;

generating a control output indicating joint torques for achieving the admissible rates of change of linear and angular momentum; and outputting the control output to joint actuators, the joint actuators causing the robot to move according to joint torques.

16. The balance controller of claim 15, wherein the desired motion comprises at least one of desired angular momentum $k_d$, desired center of mass (CoM) position $r_{G,d}$, desired center of mass velocity $\dot{r}_{G,d}$, desired joint accelerations $\ddot{\theta}_d$, desired foot configuration $T_d$, and desired foot velocity $V_d$.

17. The balance controller of claim 15, wherein determining the admissible rates of change of linear and angular momentum comprises:

determining a desired ground reaction force (GRF) and desired center of pressure (CoP) to achieve the desired rates of change of linear and angular momentum;

determining an admissible GRF and an admissible CoP by constraining the desired GRF and desired CoP to physically achievable values; and determining the admissible rates of change of linear and angular momentum from the admissible GRF and the admissible CoP.

18. The balance controller of claim 17, wherein determining the admissible GRF and the admissible CoP comprises:

preserving the desired rate of change of linear momentum and modifying the desired rate of change of angular momentum such that the robot rotates its trunk.

19. The balance controller of claim 17, wherein determining the admissible GRF and the admissible CoP comprises:

preserving the desired rate of change of angular momentum and modifying the desired rate of change of linear momentum such that the robot takes a step.

20. The balance controller of claim 19, wherein determining the admissible GRF and the admissible CoP comprises:

rotating the GRF angle such that the desired rate of change of angular momentum is preserved.

* * * * *